(12) United States Patent
Suzuki

(10) Patent No.: US 12,098,771 B2
(45) Date of Patent: Sep. 24, 2024

(54) COUPLING DEVICE AND SEALING DEVICE

(71) Applicant: NOK CORPORATION, Tokyo (JP)

(72) Inventor: Atsushi Suzuki, Fukushima (JP)

(73) Assignee: NOK CORPORATION (JP)

( * ) Notice: Subject to any disclaimer, the term of this patent is extended or adjusted under 35 U.S.C. 154(b) by 942 days.

(21) Appl. No.: 17/252,909

(22) PCT Filed: Aug. 9, 2019

(86) PCT No.: PCT/JP2019/031759
§ 371 (c)(1),
(2) Date: Dec. 16, 2020

(87) PCT Pub. No.: WO2020/049961
PCT Pub. Date: Mar. 12, 2020

(65) Prior Publication Data
US 2021/0324891 A1    Oct. 21, 2021

(30) Foreign Application Priority Data
Sep. 5, 2018 (JP) ................................. 2018-165844

(51) Int. Cl.
*F16J 15/3224* (2016.01)
*F16J 15/18* (2006.01)

(52) U.S. Cl.
CPC ........... *F16J 15/3224* (2013.01); *F16J 15/18* (2013.01)

(58) Field of Classification Search
CPC ................................. F16J 15/18; F16J 15/3224
See application file for complete search history.

(56) References Cited

U.S. PATENT DOCUMENTS 6,168,165 B1 *   1/2001   Sabo ................... F16J 15/3256
                                                         277/572
9,669,882 B2 *   6/2017   Allen ..................... B62D 25/24
(Continued)

FOREIGN PATENT DOCUMENTS

EP      1655192 B1      7/2008
JP   2006-315609 A     11/2006
(Continued)

OTHER PUBLICATIONS

European Search Report issued for the corresponding European Application No. 19856522.8; dated Oct. 8, 2021 (total 7 pages).
(Continued)

*Primary Examiner* — Gilbert Y Lee
(74) *Attorney, Agent, or Firm* — Harness, Dickey & Pierce, P.L.C.

(57) ABSTRACT

A coupling device attaches a sealing device to a panel. The sealing device seals a gap between the panel and a rotational shaft located in a shaft hole provided in the panel. The coupling device includes: a supporting wall part formed with a through hole into which the sealing device is to be inserted; multiple sealing-device hooks located on a first surface side of the supporting wall part and located around the through hole, the sealing-device hooks for being hooked on the sealing device from the outside; and multiple panel hooks located on a second surface side of the supporting wall part and located around the through hole, the panel hooks for being inserted into the shaft hole of the panel and to be hooked on a periphery of the shaft hole of the panel from the inside.

9 Claims, 11 Drawing Sheets

(56) References Cited

U.S. PATENT DOCUMENTS

2006/0108782 A1   5/2006   Kanazawa et al.
2017/0029041 A1   2/2017   Allen
2017/0146129 A1   5/2017   Allen et al.
2018/0127017 A1   5/2018   Allen

FOREIGN PATENT DOCUMENTS

JP   2010-149776 A   7/2010
JP   2015-150977 A   8/2015

OTHER PUBLICATIONS

Notice of Reasons for Refusal issued for the corresponding Japanese Patent Application No. 2020-541095; mailed on Nov. 16, 2021 (total 6 pages).
European Office Action for corresponding Application No. 19856522.8 dated Jul. 18, 2022 (4 Pages).
First Office Action for corresponding Chinese Application No. 201980047032.8 mailed Jan. 19, 2022 with English translation (13 Pages).
International Search Report (in English and Japanese) of the International Searching Authority issued in PCT/JP2019/031759, mailed Sep. 3, 2019; ISA/JP.

* cited by examiner

COUPLING DEVICE AND SEALING DEVICE

CROSS REFERENCE TO RELATED APPLICATIONS

This application is a U.S. National Phase application of International Application No. PCT/JP2019/031759, filed on Aug. 9, 2019, which claims priority to Japanese Patent Application No. 2018-165844, filed on Sep. 5, 2018. The entire disclosures of the above applications are expressly incorporated by reference herein.

BACKGROUND

Technical Field

The present invention relates to coupling devices for coupling sealing devices to panels and to sealing devices.

Related Art

Conventionally, a seal disposed around a steering shaft of an automotive vehicle is attached to a panel of the automotive vehicle via a cylindrical elongated hole cover.

SUMMARY

It is preferable to be able to easily attach a sealing device, such as a steering dust seal, arranged around a rotational shaft, to a panel.

Accordingly, the present invention provides a coupling device and a sealing device capable of easily attaching the sealing device arranged around a rotational shaft to a panel.

A coupling device according to an aspect of the present invention is a coupling device for attaching a sealing device to a panel, the sealing device sealing a gap between the panel and a rotational shaft located in a shaft hole provided in the panel, the coupling device including: a supporting wall part including a first surface, a second surface opposite to the first surface, and a through hole into which the sealing device is to be inserted; multiple sealing-device hooks located on a side of the first surface of the supporting wall part and located around the through hole, the sealing-device hooks for being hooked on the sealing device from outside; and multiple panel hooks located on a side of the second surface of the supporting wall part and located around the through hole, the panel hooks for being inserted into the shaft hole of the panel and to be hooked on a periphery of the shaft hole of the panel from inside.

In this aspect, the sealing device can be fixed to the coupling device with the use of multiple sealing-device hooks, whereas the coupling device can be fixed to the panel with the use of multiple panel hooks. Thus, the sealing device can be easily attached to the panel.

A sealing device according to an aspect of the present invention is a sealing device for sealing a gap between a panel and a rotational shaft located in a shaft hole provided in the panel, the sealing device including: a flange that is to be fixed to a coupling device for coupling the sealing device to the panel; a seal lip located radially inside the flange for being in contact with an outer peripheral surface of the rotational shaft; and an annular seal lip formed on the flange for being in contact with the coupling device.

In this aspect, the sealing device can be fixed to the coupling device with the use of the flange. Thus, the sealing device can be easily attached to the panel. In addition, since an annular seal lip is formed on the flange and is to be in contact with the coupling device, the gap between the sealing device and the coupling device is sealed with the seal lip.

DETAILED DESCRIPTION

Hereinafter, multiple embodiments according to the present invention will be described with reference to the accompanying drawings. It is noted that the drawings are not necessarily to scale, and certain features may be shown exaggerated or removed.

First Embodiment

Figure 1:
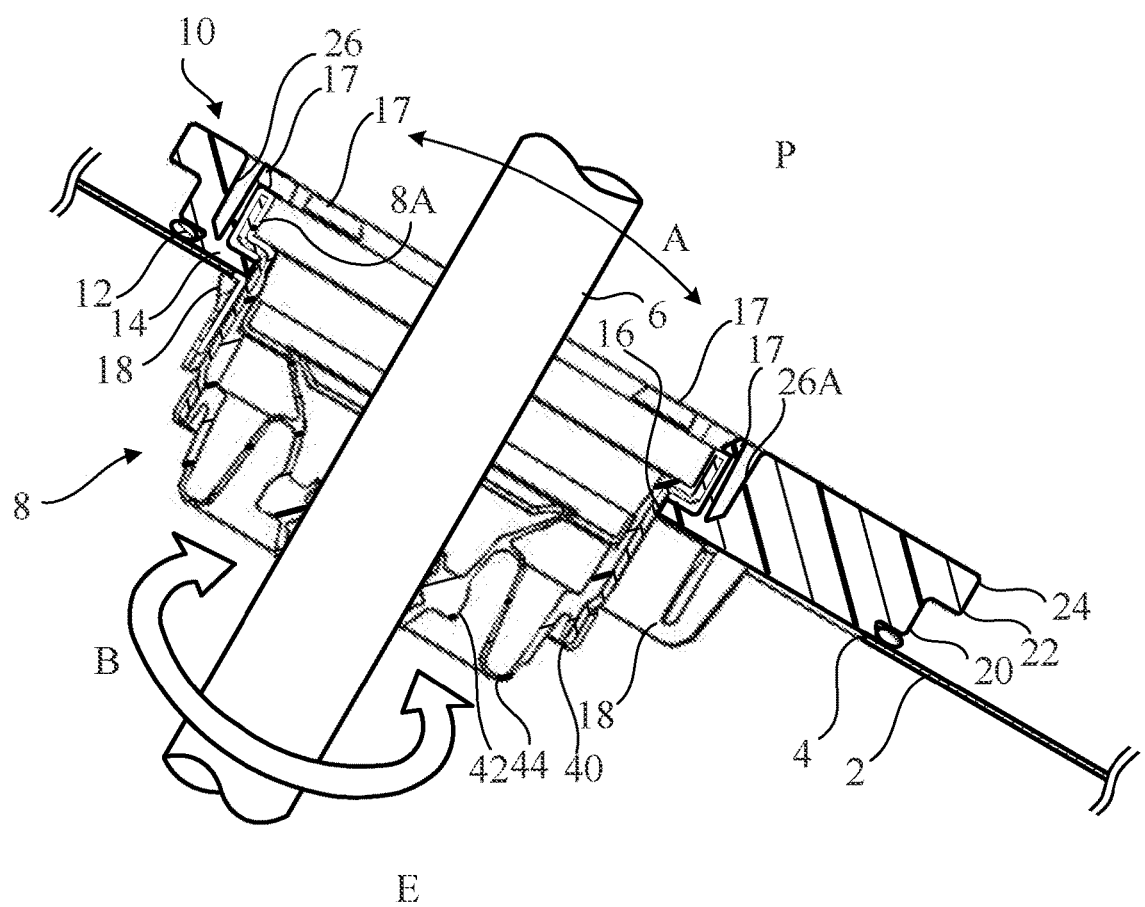
FIG. 1 is a cross-sectional view showing a state of use of a coupling device according to a first embodiment of the present invention.

As shown in FIG. 1, a sealing structure according to a first embodiment of the present invention includes a front dash panel 2 of an automotive vehicle, a rotational shaft (steering shaft) 6 located within a shaft hole 4 provided in the front dash panel 2, a sealing device 8 for sealing a gap between the front dash panel 2 and the rotational shaft 6, a coupling device 10 for attaching the sealing device 8 to the front dash panel 2, and a resilient ring 12 for sealing a gap between the coupling device 10 and the front dash panel 2. In FIG. 1, symbol E indicates the space on the engine compartment side, whereas symbol P indicates the space on the passenger compartment side.

The rotational shaft 6 is a steering shaft provided in a tilt steering mechanism. Therefore, the rotational shaft 6 is swung by the driver as indicated by arrow A. The rotational shaft 6 is rotated about the axis of the rotational shaft 6 as indicated by arrow B for steering.

The sealing device 8 is a substantially cylindrical steering dust seal, and has a function of suppressing entry of foreign matter (dust, muddy water, etc.) from the engine compartment into the passenger compartment, and suppressing transmission of sound from the engine compartment into the passenger compartment. Although details of the sealing device 8 will be described later, the sealing device 8 is configured to allow the swinging and rotation of the rotational shaft 6. The sealing device 8 has a flange 8A at the end of the engine compartment side.

In this embodiment, the entire coupling device 10 is formed of resin. However, the coupling device 10 may be made of metal or hard rubber. The coupling device 10 may be a composite of resin and metal, a composite of hard rubber and metal, or a composite of resin, hard rubber and metal.

The coupling device 10 has a wall part 14, multiple sealing-device hooks 17, and multiple panel hooks 18. The wall part 14 is to be in surface contact with the front dash panel 2 and covers the shaft hole 4 of the front dash panel 2. A circular through hole 16 is formed in the wall part 14, and a substantially cylindrical sealing device 8 is inserted into the through hole 16.

The sealing-device hooks 17 are located on the side of the first surface (passenger compartment side) of the wall part 14 and are located around the through hole 16. When the sealing device 8 is inserted into the through hole 16, the sealing-device hooks 17 are arranged outside the sealing device 8. The sealing-device hooks 17 extend in parallel to the axial direction of the sealing device 8 from the wall part 14. Distal hasp portions of the sealing-device hooks 17 are hooked on the flange 8A of the sealing device 8 from the outside. The flange 8A of the sealing device 8 is pinched between the distal hasp portions of the sealing-device hooks 17 and the wall part 14, so that the sealing device 8 is fixed to the coupling device 10.

The panel hooks 18 are located on the side of the second surface (engine compartment side) of the wall part 14, and are located around the through hole 16. When the sealing device 8 is inserted into the through hole 16, the panel hooks 18 are arranged outside the sealing device 8. The panel hooks 18 extend from the wall part 14 in parallel to the axial direction of the sealing device 8, and are inserted into the shaft hole 4 of the front dash panel 2. Distal hasp portions of the panel hooks 18 are hooked on the periphery of the shaft hole 4 of the front dash panel 2 from the inside. The front dash panel 2 is pinched between the distal hasp portions of the panel hooks 18 and the wall part 14, so that the coupling device 10 is fixed to the front dash panel 2.

In this embodiment, the resilient ring 12 is an O-ring. However, the resilient ring 12 may be a D ring having a D-shaped cross section, an X ring having an X-shaped cross section, a T ring having a T-shaped cross section, or a ring having a triangular cross section, instead of an O-ring. The resilient ring 12 is disposed around the wall part 14, that is, around the shaft hole 4, and is compressed between the coupling device 10 and the front dash panel 2 to seal the gap between the coupling device 10 and the front dash panel 2, and suppresses the entry of foreign matter from the engine compartment into the passenger compartment.

Figure 2:
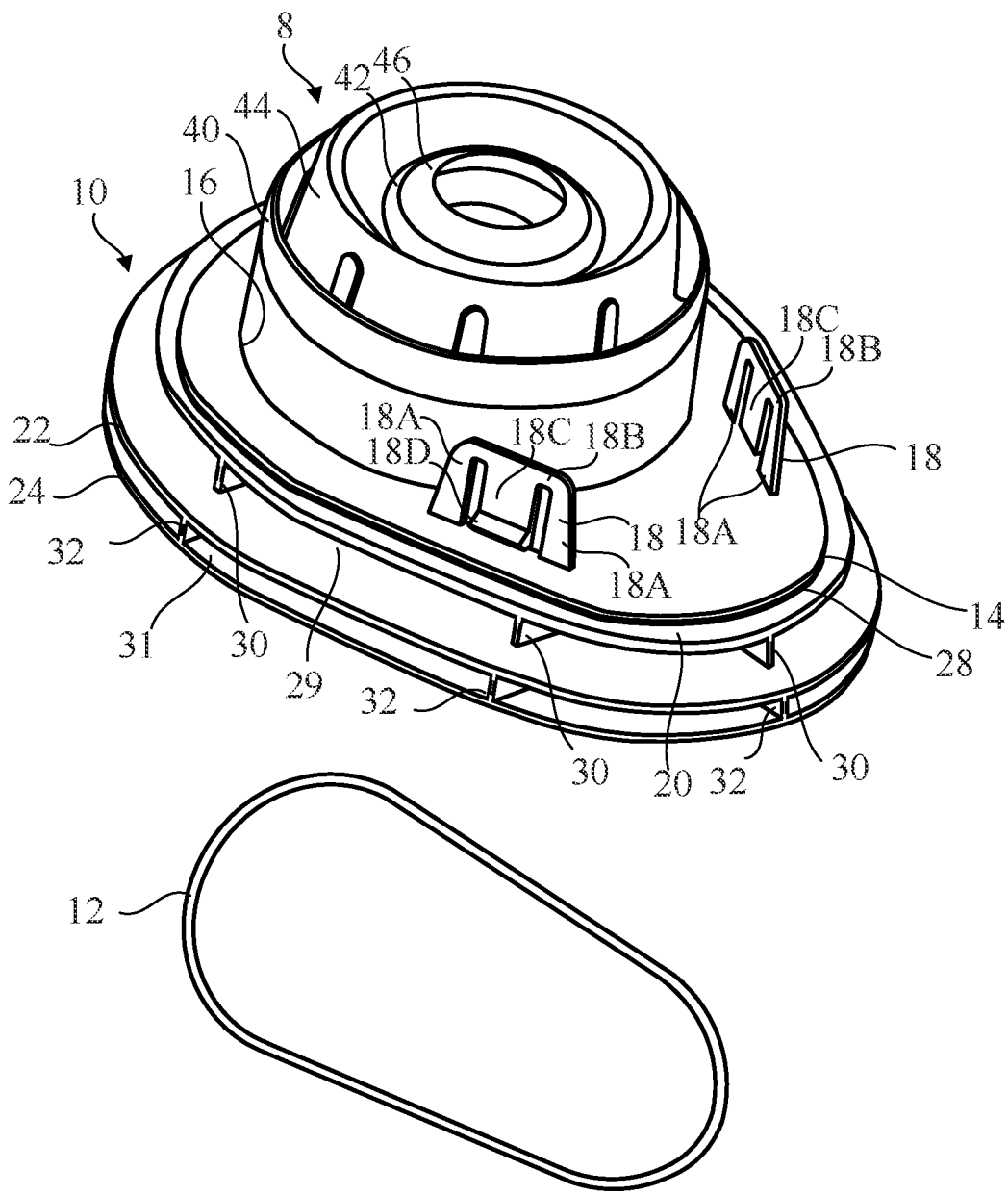
FIG. 2 is a perspective view showing the coupling device according to the first embodiment on which a sealing device is mounted, and a resilient ring.
Figure 3:
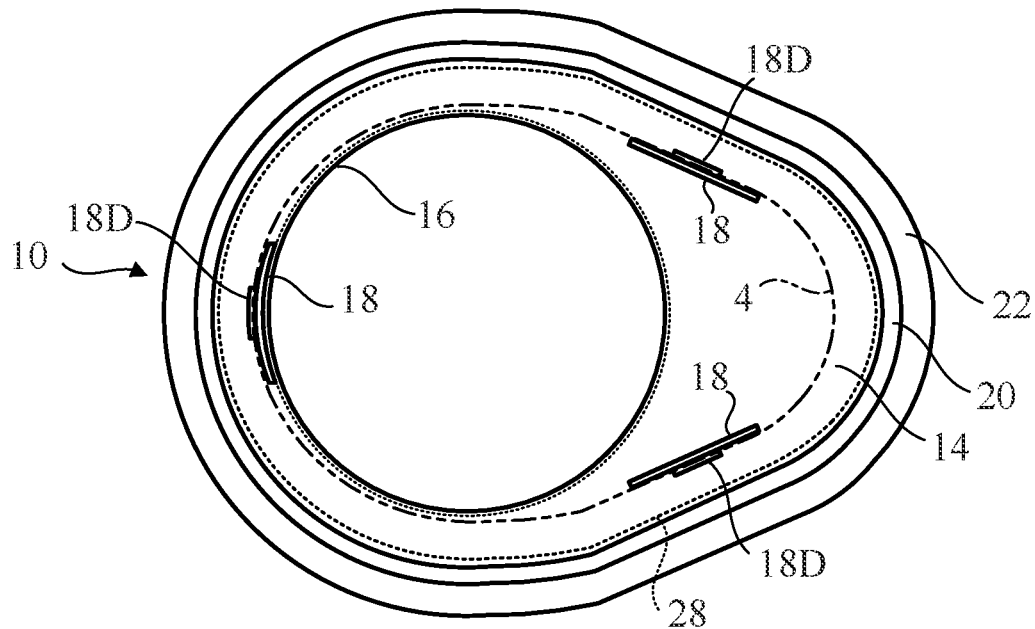
FIG. 3 is a plan view of the coupling device according to the first embodiment.
Figure 4:
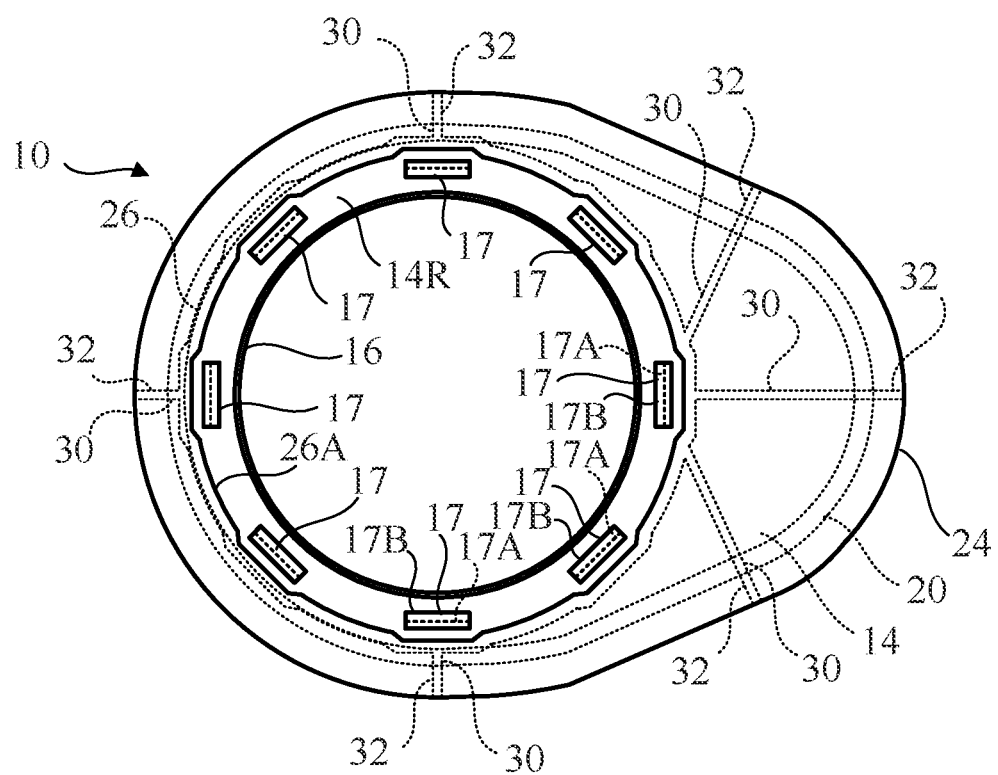
FIG. 4 is a bottom view of the coupling device according to the first embodiment.
Figure 5:
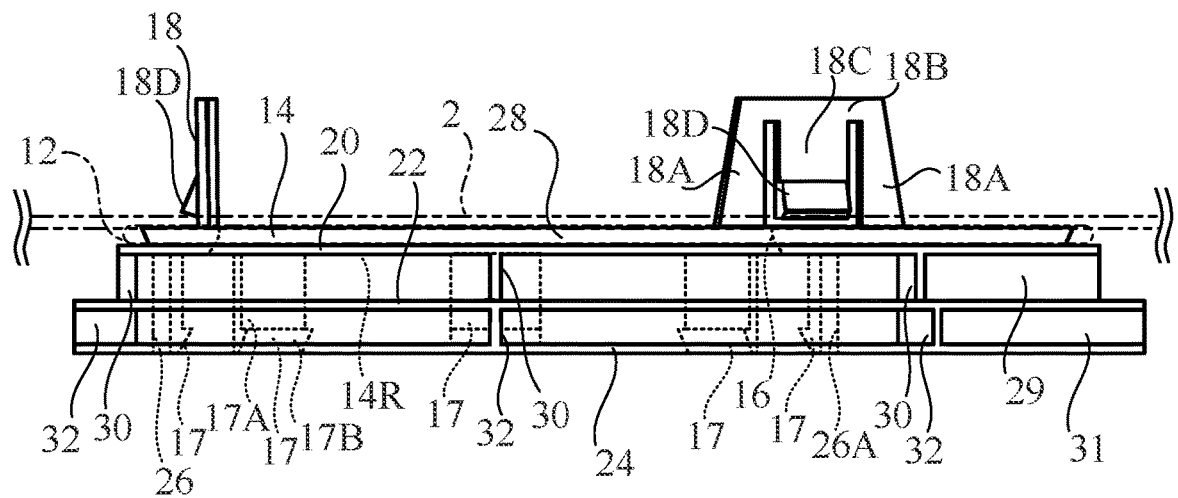
FIG. 5 is a side view of the coupling device according to the first embodiment.

FIG. 2 is a perspective view showing the coupling device 10 on which the sealing device 8 is mounted and the resilient ring 12. FIG. 2 is inverted compared to FIG. 1. FIGS. 3 to 5 show only the coupling device 10. FIG. 3 is a plan view of the coupling device 10, FIG. 4 is a bottom view of the coupling device 10, and FIG. 5 is a side view of the coupling device 10. The top and bottom of FIGS. 3 to 5 correspond to FIG. 2 and are opposite to FIG. 1.

As shown in FIGS. 2 to 5, the coupling device 10 has three walls arranged parallel to the wall part (supporting wall part) 14, i.e., a wall (large wall part) 20, an extremely-large wall part 22, and a second large wall part 24. The outline shape of the wall part 14 is similar to that of the shaft hole 4 (shown in phantom line in FIG. 3) of the front dash panel 2 covered by the wall part 14, and the outline shapes of the wall parts 20, 22, and 24 are also similar to that of the shaft hole 4. The outline shape of the wall parts 14, 20, 22, 24 in this embodiment are egg shapes similar to that of the shaft hole 4, but the outline shapes of the wall parts 14, 20, 22, 24 are not limited to the embodiment. The outline of the wall part 20 is larger than the outline of the wall part 14, whereas the outlines of the extremely-large wall part 22 and the second extremely-large wall part 24 farther from the wall part 14 than the wall part 20 are larger than the outline of the wall part 20. The outline of the extremely-large wall part 22 and the outline of the second extremely-large wall part 24 are the same.

As shown in FIG. 3, three panel hooks 18 are integrally attached to the obverse surface of the wall part 14. The panel hooks 18 are arranged so as to be insertable into the shaft hole 4 of the front dash panel 2, which is indicated by a phantom line in FIG. 3.

Figure 6:
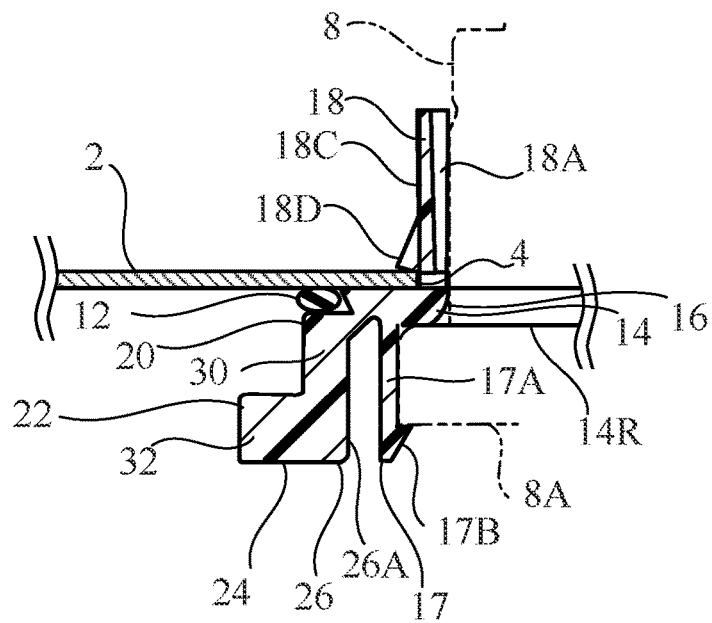
FIG. 6 is an enlarged cross-sectional view of a part of FIG. 5.

As shown in FIGS. 2 and 5, each panel hook 18 has a pair of leg portions 18A, a connecting portion 18B, a lever portion 18C, and a distal hasp portion 18D. The leg portions 18A are secured to the obverse surface of the wall part 14 and extends substantially perpendicular to the wall part 14. The connecting portion 18B is coupled to the distal ends of the pair of leg portions 18A. The lever portion 18C is suspended from the connecting portion 18B toward the wall part 14, and can swing about the connecting portion 18B as a fulcrum. The distal hasp portion 18D is a protrusion formed at the distal end of the lever portion 18C, and protrudes outward. When the coupling device 10 is fixed to the front dash panel 2, the lever portions 18C are swung inward so that the panel hooks 18 are inserted into the shaft hole 4 of the front dash panel 2, and then, the distal hasp portions 18D are caught by the periphery of the shaft hole 4 of the front dash panel 2 from the inside. In this way, as shown in FIG. 6, the front dash panel 2 is pinched between the distal hasp portions 18D of the panel hooks 18 and the wall part 14, whereby the coupling device 10 is fixed to the front dash panel 2. The number, arrangement, and shape of the panel hooks 18 are not limited to this embodiment.

As shown in FIG. 4, eight sealing-device hooks 17 are integrally attached to the reverse surface 14R of the wall part 14. The sealing-device hooks 17 are arranged on a circle coaxial with the through hole 16.

As shown in FIGS. 4 and 5, each sealing-device hook 17 has a leg portion 17A and a distal hasp portion 17B. The leg portion 17A is fixed to the reverse surface 14R of the wall part 14, and extends perpendicularly to the wall part 14. The leg portion 17A is swingable about its proximal end as a fulcrum. The distal hasp portion 17B is a protrusion formed at the distal end of the leg portion 17A and protrudes inward.

When the coupling device 10 is fixed to the sealing device 8, the leg portions 17A are swung outward so that the flange 8A of the sealing device 8 is placed inside the sealing-device hooks 17, and then, the distal hasp portions 17B are hooked on the flange 8A of the sealing device 8 from the outside. Thus, as shown in FIG. 6, the flange 8A of the sealing device 8 is pinched between the distal hasp portions 17B of the sealing-device hooks 17 and the wall part 14, whereby the sealing device 8 is fixed to the coupling device 10. The number, arrangement, and shape of the sealing-device hooks 17 are not limited to this embodiment.

As is apparent from FIGS. 1, 4, and 6, the inner edges of the wall part 20, the extremely-large wall part 22, and the second extremely-large wall part 24 are connected by a ring 26, which is connected to the wall part 14. The ring 26 is located outside the multiple sealing-device hooks 17, and the wall parts 20, 22, 24 are also located outside the sealing-device hooks 17. The flange 8A of the sealing device 8 is arranged inside the ring 26 and is fixed by means of multiple sealing-device hooks 17.

As shown in FIG. 4, the ring 26 is substantially circular, but portions adjacent the sealing-device hooks 17 protrude outwardly. The inner peripheral surface 26A of the ring 26 is spaced apart from the sealing-device hooks 17 so as to allow elastic deformation of the sealing-device hooks 17.

As shown in FIGS. 2, 3, and 5, a circumferential groove 28 is formed between the surface on the side of the panel hooks 18 (the second surface) of the wall part 14 and the wall part 20. More specifically, in this embodiment, the circumferential surface of the wall part 14 is inclined to form the circumferential groove 28. The resilient ring 12 is fitted into the circumferential groove 28. As shown in FIG. 6, the resilient ring 12 is arranged around the wall part 14, i.e. around the shaft hole 4, and is compressed between the wall part 20 and the front dash panel 2 to seal the gap between the coupling device 10 and the front dash panel 2.

As shown in FIGS. 2 and 5, a clearance 29 is provided between the wall part 20 and the extremely-large wall part 22, which is disposed farther from the panel hooks 18 than the wall part 20. As shown in FIGS. 2, 4, and 5, multiple reinforcing ribs 30 are formed in the clearance 29 to connect the wall part 20 and the extremely-large wall part 22. Each reinforcing rib 30 extends from the outer peripheral surface of the ring 26 to the outline of the wall part 20. The multiple reinforcing ribs 30 increase the rigidity of the wall part 20 and the extremely-large wall part 22, and thus, the rigidity of the coupling device 10.

The number, arrangement, and shape of the reinforcing ribs 30 are not limited to this embodiment. Although each reinforcing rib 30 connects the ring 26 with the wall part 20, and the extremely-large wall part 22 in this embodiment, there may be clearances between the inner edge of any or all of the reinforcing ribs 30 and the ring 26. The outer edge of each reinforcing rib 30 is smoothly contiguous with, i.e. flush with, the outline of the wall part 20 in this embodiment, but may be located inside the outline of the wall part 20.

As shown in FIGS. 2 and 5, a clearance 31 is provided between the extremely-large wall part 22 and the second extremely-large wall part 24, which is disposed farther from the panel hooks 18 than the extremely-large wall part 22. As shown in FIGS. 2, 4 and 5, multiple reinforcing ribs 32 are formed in the clearance 31 to connect the extremely-large wall part 22 and the second extremely-large wall part 24. Each reinforcing rib 32 extends from the outer peripheral surface of the ring 26 to the outline of the extremely-large wall part 22 and the outline of the second extremely-large wall part 24. The multiple reinforcing ribs 32 increase the rigidity of the extremely-large wall part 22 and the second extremely-large wall part 24, and thus, the rigidity of the coupling device 10.

The number, arrangement, and shape of the reinforcing ribs 32 are not limited to this embodiment. Although each reinforcing rib 32 connects the ring 26 with the extremely-large wall part 22, and the second extremely-large wall part 24 in this embodiment, there may be clearances between the inner edge of any or all of the reinforcing ribs 32 and the ring 26. The outer edge of each reinforcing rib 32 is smoothly contiguous (i.e., flush) with the outlines of the extremely-large wall part 22 and the second extremely-large wall part 24 in this embodiment, but may be located inside the outlines of the extremely-large wall part 22 and the second extremely-large wall part 24.

Next, the sealing device 8 will be described with reference to FIG. 7. The sealing device 8 according to the embodiment is only an example, and the use of the present invention is not limited to the embodiment. Various types of steering dust seals can be coupled to the front dash panel 2 by means of the coupling device 10.

Figure 7:
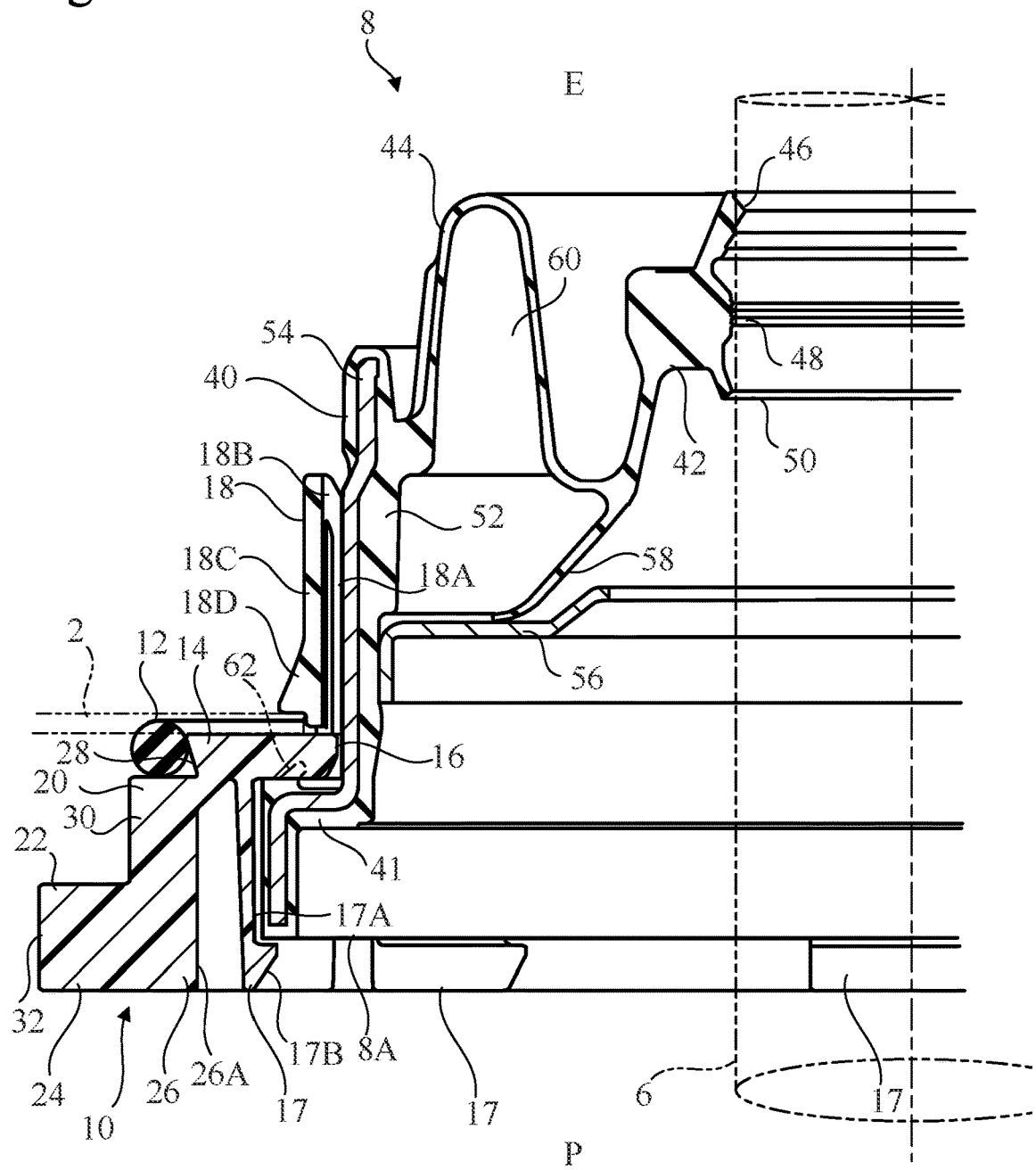
FIG. 7 is an enlarged cross-sectional view showing a state of use of the coupling device according to the first embodiment.
Figure 7:
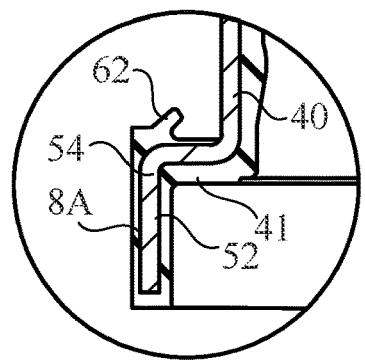

The top and bottom of FIG. 7 correspond to FIG. 2, and are opposite to FIG. 1. The sealing device 8 is an annular component, the left half of which is shown in FIG. 7. In FIG. 7, symbol E indicates the space on the engine compartment side, whereas P indicates the space on the passenger compartment side.

The sealing device 8 is basically a highly elastic component made of an elastic material, for example an elastomer, and includes an annular flange 8A to be attached to the coupling device 10, an outer annular part 40 arranged radially inside the flange 8A, an inner annular part 42 arranged radially inside the outer annular part 40, and a folded bellows part 44 connecting the outer annular part 40 and the inner annular part 42. The flange 8A and the outer annular part 40 are arranged coaxially and are connected by a connecting annular part 41. The outer annular part 40 is inserted into the through hole 16 of the coupling device 10.

In addition, the sealing device 8 has multiple seal lips 46, 48, and 50 extending from the inner annular part 42 for being in contact with the outer circumferential surface of the rotational shaft 6 over the entire circumference. The seal lips 46, 48, and 50 are elastically deformed since they are in contact with the rotational shaft 6. The inner annular part 42, the bellows part 44, and the seal lips 46, 48, and 50 are formed of an elastic material, for example, an elastomer. In this embodiment, three seal lips 46, 48, and 50 are provided, but the number of seal lips is not limited to the embodiment, and may be one, two, or four or more. The shape of the seal lip is not limited to the embodiment. A sliding member on which the rotational shaft 6 slides may be provided between the inner annular part 42 and the rotational shaft 6. A reinforcing ring for reinforcing the inner annular part 42 may be embedded in the inner annular part 42.

The flange 8A and outer annular part 40 have an elastic ring 52 formed of an elastic material, e.g., an elastomer, and a rigid ring 54 formed of a rigid material, e.g., a metal, secured to the elastic ring 52. As shown, the elastic ring 52 covers the entire inner circumferential surface of the rigid ring 54. In other words, most of the elastic ring 52 is disposed radially inside the elastic ring 52. However, the elastic ring 52 covers the outer peripheral surface of the rigid ring 54 at the flange 8A, the connecting ring part 41, and at the end of outer annular part 40 that is opposed to the flange 8A.

The rotational shaft 6 is a steering shaft provided in a tilt steering mechanism. Therefore, the rotational shaft 6 can be eccentric because it is swung by the driver. The bellows part 44 is a portion that is easily elastically deformed, and is provided so as to allow movement, i.e., the eccentricity of the rotational shaft 6 by means of the elastic deformation thereof, and to allow the seal lips 46, 48, and 50 to be in contact with the outer peripheral surface of the rotational shaft 6 over the entire circumference.

In addition, the sealing device 8 includes a sound insulating ring 56. The sound insulating ring 56 is disposed at a location distant from the bellows part 44, is fixed to the outer annular part 40, and expands radially inward from the outer annular part 40. The sound insulating ring 56 is provided to block the transmission of sound from the space E on the engine compartment side to the space P on the passenger compartment side, and the material thereof is not limited. However, it is preferable that the sound insulating ring 56 be formed of a rigid material, for example, resin or metal, in order to maintain a sealed space, which is described later. The sound insulating ring 56 can be formed by, for example, pressing a sheet metal. Alternatively, the sound insulating ring 56 may be formed of a resin material by injection molding or press molding.

Furthermore, the sealing device 8 has a circular annular sound insulating lip 58 made of an elastic material, for example an elastomer. In this embodiment, the sound insulating lip 58 protrudes from the bellows part 44 toward the sound insulating ring 56. However, the sound insulating lip 58 may protrude from the inner annular part 42 toward the sound insulating ring 56, or may protrude from the connecting portion of the inner annular part 42 and the bellows part 44 toward the sound insulating ring 56. The sound insulating lip 58 protrudes obliquely radially outward, and the distal end portion of the sound insulating lip 58 is in slidable contact with the circular annular portion of the sound insulating ring 56 without a gap.

The outer annular part 40, the bellows part 44, the sound insulating ring 56, and the sound insulating lip 58 define a sealed space 60 for attenuating sound. When the rotational shaft 6 swings and is eccentric with respect to the flange 8A of the sealing device 8, the sound insulating ring 56 does not move, whereas the sound insulating lip 58 moves laterally following the rotational shaft 6.

As described above, in the flange 8A and the connecting ring part 41, the elastic ring 52 covers the outer peripheral surface of the rigid ring 54. An annular seal lip 62, which is a part of the elastic ring 52, is formed on the surface of the connection ring part 41 on the side of the bellows part 44, the connection ring part 41 connecting the flange 8A and the outer annular part 40. The surface is also the surface of the flange 8A on the side of the bellows part 44.

As shown by the solid line in the circle of FIG. 7, the seal lip 62 extend obliquely inward in radial directions from a surface of the flange 8A that is perpendicular to the axial direction of the flange 8A in the initial state (in which the seal lip 62 is not in contact with any object). When the sealing device 8 is mounted on the coupling device 10 so that the flange 8A is pinched between the distal hasps 17B of the sealing-device hooks 17 and the wall part 14 of the coupling device 10, the seal lip 62 are axially compressed by the wall part 14. Thus, the seal lip 62 seals the gap between the sealing device 8 and the coupling device 10 and restricts foreign matter from entering the passenger compartment from the engine compartment.

In this embodiment, multiple sealing-device hooks 17 projecting from the reverse surface 14R of the wall part 14 of the coupling device 10 can be used to secure the sealing device 8 to the coupling device 10, whereas multiple panel hooks 18 projecting from the obverse surface of the wall part 14 can be used to secure the coupling device 10 to the front dash panel 2. Therefore, the sealing device 8 can be easily attached to the front dash panel 2.

In this embodiment, the sealing-device hooks 17 protrude directly from the reverse surface 14R of the wall part 14 with which the flange 8A of the sealing device 8 is in surface contact, but the proximal ends of the sealing-device hooks 17 do not have to coincide with the reverse surface 14R of the wall part 14. In addition, the panel hooks 18 directly protrude from the obverse surface of the wall part 14 that is in surface contact with the front dash panel 2, but the proximal ends of the panel hooks 18 do not have to coincide with the surface of the wall part 14.

In this embodiment, the sealing device 8 has a flange 8A, which is fixed to the coupling device 10, and an annular seal lip 62, which is formed on the surface of the flange 8A that is perpendicular to the axial direction of the flange 8A and that is in contact with the coupling device 10. The sealing device 8 can be fixed to the coupling device 10 by means of the flange 8A. Thus, the sealing device 8 can be easily attached to the panel 2. In addition, since the annular seal lip 62, which is in contact with the coupling device 10, is formed on the surface of the flange 8A that is perpendicular to the axial direction of the flange 8A, the gap between the sealing device 8 and the coupling device 10 is sealed by the annular seal lip 62, so that the entry of foreign matter from the engine compartment into the passenger compartment is suppressed.

As shown in FIG. 7, the axial length of the coupling device 10 is less than the axial length of the sealing device 8. By reducing the size of the coupling device 10 in this manner, the space for attaching the sealing device 8 to the panel 2 can be reduced.

In addition, a circumferential groove 28 is formed between the wall part 14 and the wall part 20 having an outline larger than the outline of the wall part 14, and the resilient ring 12 fitted in the circumferential groove 28 is compressed between the wall part 20 and the front dash panel 2. Therefore, the gap between the coupling device 10 and the front dash panel 2 can be sealed.

Furthermore, the extremely-large wall part 22 having a larger outline than that of the wall part 20 is located farther from the panel hooks 18 than the wall part 20. The extremely-large wall part 22 is located farther from the front dash panel 2 than the wall part 20 facing the front dash panel 2, and has an outline larger than that of the wall part 20. Thus, the coupling device 10 can be easily handled, for example, the user can grasp the extremely-large wall part 22 to carry the coupling device 10, resulting in that attachment to the front dash panel 2 and removal from the front dash panel 2 are easy.

The multiple reinforcing ribs 30 connecting the wall part 20 and the extremely-large wall part 22 improve the rigidity of the wall part 20 and the extremely-large wall part 22, and thus, the rigidity of the connection device 10. Since each reinforcing rib 30 terminates at the outline of the wall part 20 and does not protrude from the wall part 20, it does not interfere with the handling of the coupling device 10.

Furthermore, the extremely-large wall part 22 and the second extremely-large wall part 24 having a larger outline than that of the wall part 20 are located farther from the panel hooks 18 than the wall part 20. Thus, the coupling device 10 can be easily handled, for example, the user can grasp the extremely-large wall part 22 and the second extremely-large wall part 24 to carry the coupling device 10, resulting in that attachment to the front dash panel 2 and detachment from the front dash panel 2 are easy.

The multiple reinforcing ribs 32 connecting the extremely-large wall part 22 and the second extremely-large wall part 24 improve the rigidity of the extremely-large wall part 22 and the second extremely-large wall part 24, and thus, the rigidity of the coupling device 10. Since each reinforcing rib 32 terminates at the outlines of the extremely-large wall part 22 and the second extremely-large wall part 24, and does not protrude from the extremely-large wall part 22 and the second extremely-large wall part 24, it does not interfere with the handling of the coupling device 10.

Second Embodiment

Figure 8:
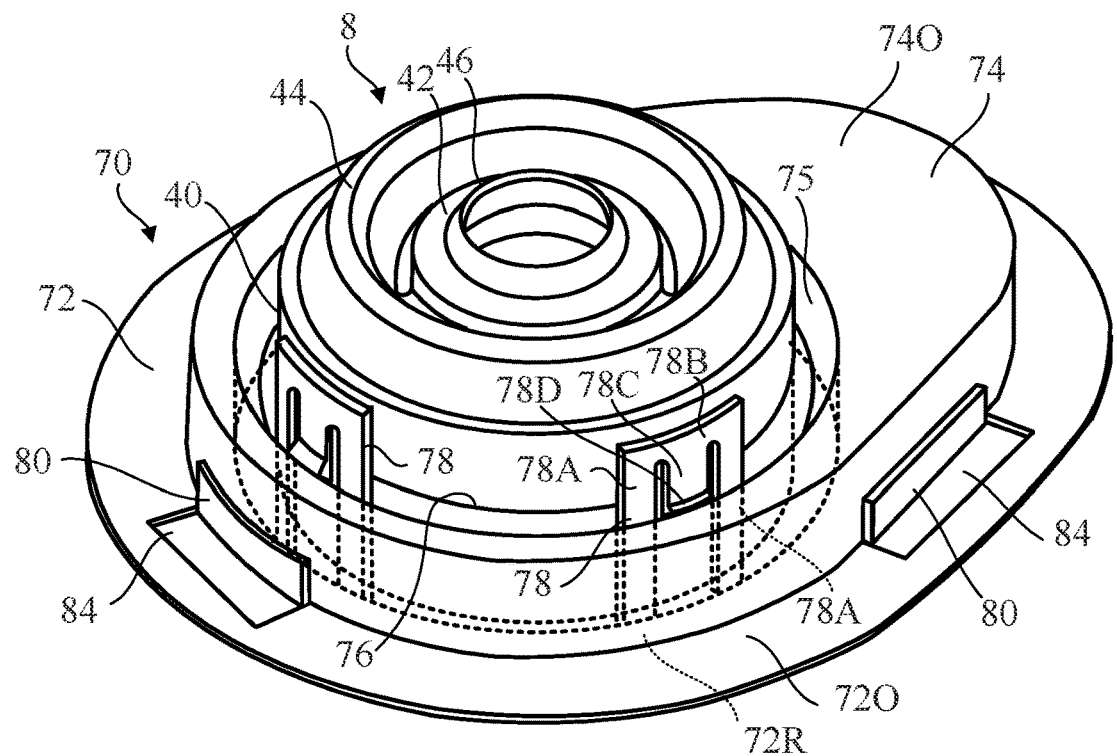
FIG. 8 is a perspective view showing a coupling device according to a second embodiment of the present invention on which a sealing device is mounted.

FIGS. 8 to 12 show a second embodiment of the present invention. In FIG. 8 and the subsequent figures, the same reference symbols are used for identifying components already described, and these components will not be described in detail.

Figure 9:
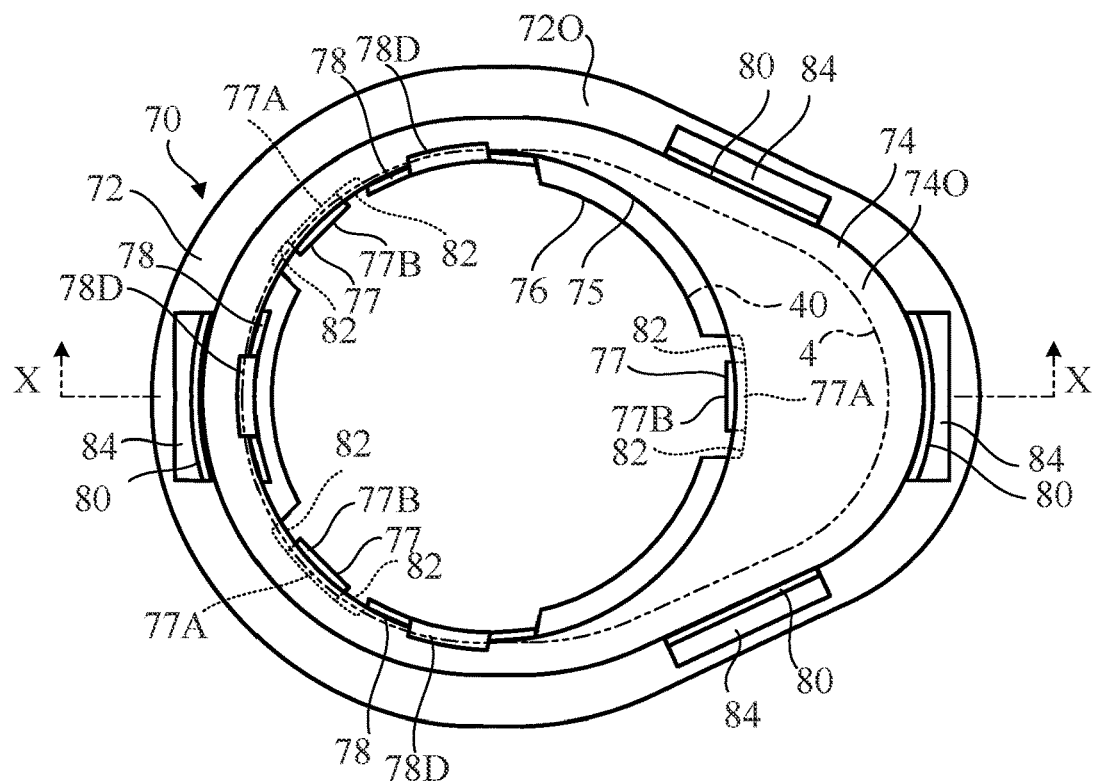
FIG. 9 is a plan view of the coupling device according to the second embodiment.
Figure 10:
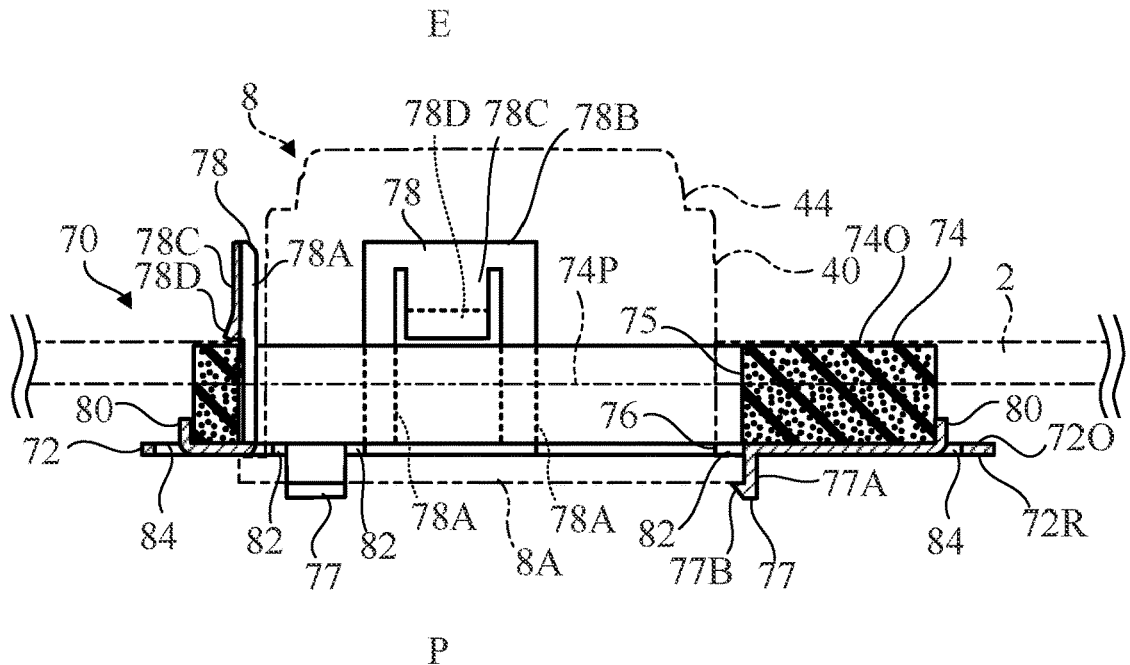
FIG. 10 is a cross-sectional view taken along line X-X in FIG. 9.
Figure 11:
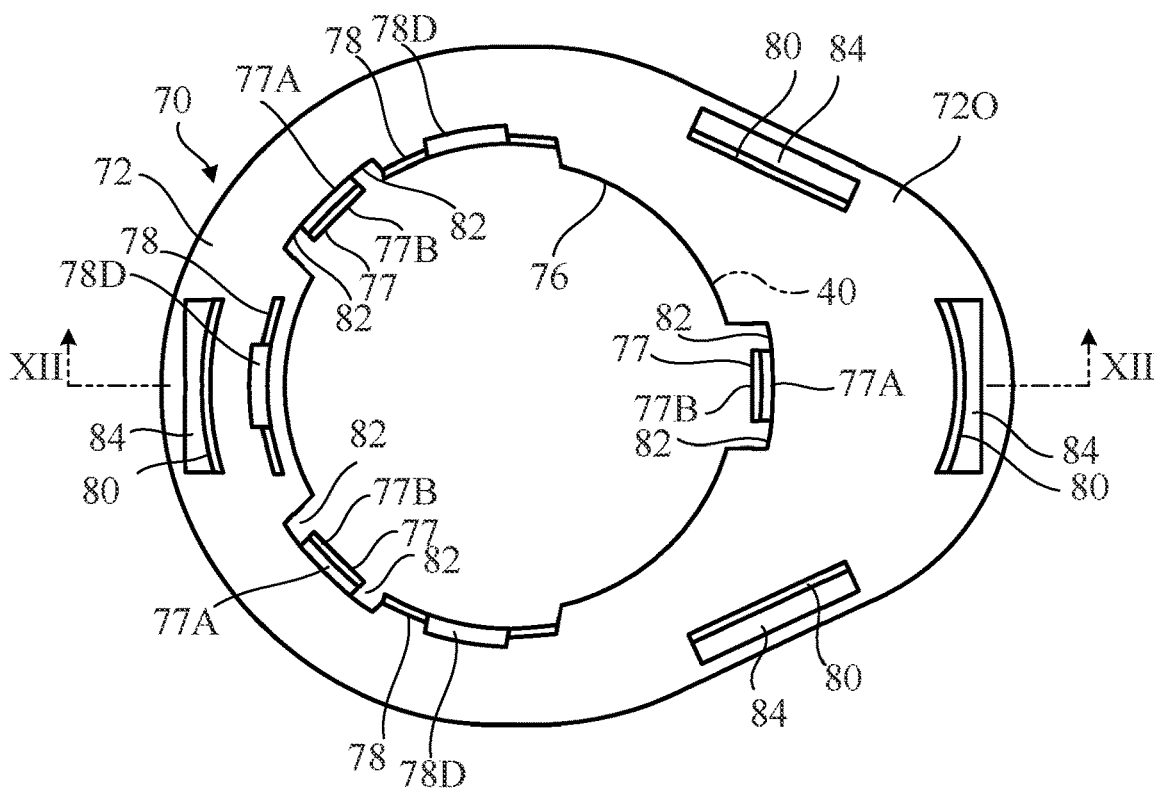
FIG. 11 is a plan view of a supporting wall part of the coupling device according to the second embodiment.
Figure 12:
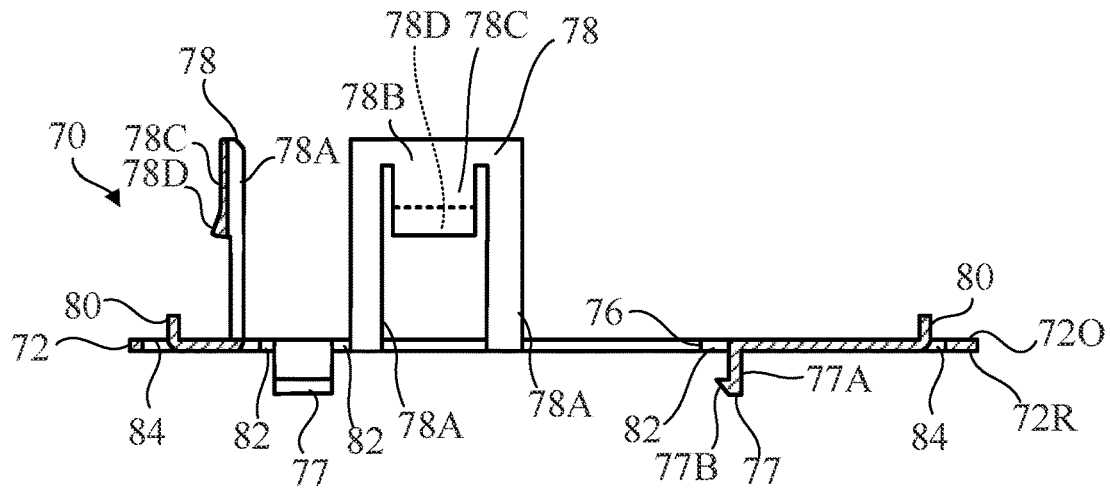
FIG. 12 is a cross-sectional view taken along line XII-XII in FIG. 11.

The coupling device 70 according to this embodiment is also used to attach the sealing device 8, which seals the gap between the front dash panel 2 and the rotational shaft 6, to the front dash panel 2 in a manner similar to that shown in FIG. 1. FIG. 8 is a perspective view showing the coupling device 70 on which the sealing device 8 is mounted. FIG. 8 is inverted compared to FIG. 1. FIG. 9 is a plan view of the coupling device 70, whereas FIG. 10 is a side cross-sectional view of the coupling device 70. FIG. 11 is a plan view of the wall part 72 of the coupling device 70, whereas FIG. 12 is a side cross-sectional view of the wall part 72. The top and bottom of FIGS. 9 to 12 correspond to FIG. 8 and are opposite to FIG. 1.

The coupling device 70 has a wall part (supporting wall part) 72 and a wall part (foam part) 74 connected to each other. The wall part 72 and the wall part 74 are arranged parallel to each other.

The wall part 72 is made of resin. However, the wall part 72 may be made of metal or hard rubber. The wall part 72 may be a composite of resin and metal, a composite of hard rubber and metal, or a composite of resin, hard rubber, and metal.

A circular through hole 76 is formed in the wall part 72, and the outer annular part 40 of the substantially cylindrical sealing device 8 is inserted into the through hole 76.

The wall part 74 is formed of a foam material. Preferred foam materials include foamed rubbers, e.g., foamed ethylene propylene diene rubber, or foamed resins. The wall part 74 is constituted of a single plate of a uniform thickness in which a circular through hole 75 is formed. The outer annular part 40 of the sealing device 8 is inserted into the through hole 75.

The front dash panel 2 is brought into surface contact with the obverse surface 74O of the wall part 74, which is the surface opposite to the surface on the side of the wall part 72. The obverse surface 74O covers the shaft hole 4 of the front dash panel 2, which is shown in phantom line in FIG. 9. The outline shape of the wall part 74 is similar to that of the shaft hole 4 of the front dash panel 2 covered by the wall part 74, whereas the outline shape of the wall part 72 is also similar to that of the shaft hole 4. The outline shapes of the wall parts 72 and 74 in this embodiment are egg shapes similar to the shaft hole 4, but the outline shapes of the wall parts 72 and 74 are not limited to the embodiment. The outline of the wall part 72 is larger than the outline of the wall part 74.

The coupling device 70 has multiple sealing-device hooks 77, multiple panel hooks 78, and multiple restraining walls 80. The wall part 72, the sealing-device hooks 77, the panel hooks 78, and the restraining walls 80 are formed of a single plate.

The sealing-device hooks 77 are located on the side of the first surface of the wall part 72 and are located around the through hole 76. When the sealing device 8 is inserted into the through hole 76, the sealing-device hooks 77 are arranged outside the sealing device 8. The sealing-device hooks 77 extend in parallel to the axial direction of the sealing device 8 from the wall part 72. Distal hasp portions of the sealing-device hooks 77 are hooked on the flange 8A of the sealing device 8 from the outside.

More specifically, three sealing-device hooks 77 are integrally attached to the reverse surface 72R of the wall part 72. The sealing-device hooks 77 are arranged on a circle coaxial with the through holes 75 and 76.

Each sealing-device hook 77 has a leg portion 77A and a distal hasp portion 77B. The leg portion 77A is secured to the reverse surface 72R of the wall part 72 and extends perpendicularly to the wall part 72. The leg portion 77A is swingable about its proximal end as a fulcrum. The distal hasp portion 77B is a projection formed at the distal end of the leg portion 77A and protrudes inward. When the coupling device 70 is fixed to the sealing device 8, the leg portions 77A are swung outwards, so that the flange 8A of the sealing device 8 is placed inside the sealing-device hooks 77, and then, the distal hasp portions 77B are hooked on the flange 8A of the sealing device 8 from the outside. Thus, as shown in FIG. 10, the flange 8A of the sealing device 8 is pinched between the distal hasp portions 77B of the sealing-device hooks 77 and the wall part 72, whereby the sealing device 8 is fixed to the coupling device 70. The number, arrangement, and shape of the sealing-device hooks 77 are not limited to this embodiment.

The panel hooks 78 are located on the side of the second surface of the wall part 72, i.e., the engine compartment side, and are located around the through hole 76. When the sealing device 8 is inserted into the through hole 76, the panel hooks 78 are arranged outside the sealing device 8. The panel hooks 78 extend from the wall part 72 in parallel to the axial direction of the sealing device 8, and are inserted into the shaft hole 4 of the front dash panel 2. Distal hasp portions of the panel hooks 78 are hooked on the periphery of the shaft hole 4 of the front dash panel 2 from the inside. The front dash panel 2 is pinched between the distal hasp portions of the panel hooks 78 and the wall part 72, so that the coupling device 70 is fixed to the front dash panel 2.

More specifically, three panel hooks 78 are integrally attached to the second surface 72O of the wall part 72. The panel hooks 78 are arranged so as to be insertable into the shaft hole 4 of the front dash panel 2, which is indicated in phantom line in FIG. 9.

Each panel hook 78 has a pair of leg portions 78A, a connecting portion 78B, a lever portion 78C, and a distal hasp portion 78D. The leg portions 78 are secured to the obverse surface 72O of wall part 72 and extends substantially perpendicular to the wall part 72. The connecting portion 78B is coupled to the distal ends of the pair of leg portions 78A. The lever portion 78C is suspended from the connecting portion 78B toward the wall part 72, and can swing about the connecting portion 78B as a fulcrum. The distal hasp portion 78D is a protrusion formed at the distal end of the lever portion 78C, and protrudes outward. When the coupling device 70 is fixed to the front dash panel 2, the lever portions 78C are swung inward so that the panel hooks 78 are inserted into the shaft hole 4 of the front dash panel 2, and then, the distal hasp portions 78D are caught by the periphery of the shaft hole 4 of the front dash panel 2 from the inside. Thus, as shown in FIG. 10, the front dash panel 2 is pinched between the distal hasp portions 78D of the panel hooks 78 and the wall part 72, whereby the coupling device 70 is fixed to the front dash panel 2. The number, arrangement, and shape of the panel hooks 78 are not limited to this embodiment.

The wall part 74 formed of a foam material may be compressed to change the volume thereof. When the coupling device 70 is fixed to the front dash panel 2, the wall part 74 is sandwiched between the wall part 72 and the front dash panel 2 and compressed. The phantom line 74P in FIG. 10 shows the height of the obverse surface 740 of the wall part 74 thus compressed. The wall part 74 is located around the shaft hole 4 of the front dash panel 2, is compressed between the wall part 72 and the front dash panel 2 for sealing the gap between the wall part 72 and the front dash panel 2 to suppress the entry of foreign matter from the engine compartment into the passenger compartment.

When the coupling device 70 is not fixed to the front dash panel 2, the wall part 74 has an initial height, as shown in solid line in FIG. 10. In this state, the wall part 74 is pinched between the distal hasp portions 78D of the panel hooks 78 and the wall part 72.

Multiple restraining walls 80 are integrally attached to the obverse surface 720 of the wall part 72. The restraining walls 80 are arranged along the outline of the wall part 74 and cooperate to enclose the wall part 74. Thus, the wall part 74 is fixed to the wall part 72.

As described above, the wall part 72, the sealing-device hooks 77, the panel hooks 78, and the restraining walls 80 are formed of a single plate. For example, the structure can be formed by pressing a flat plate of metal. As shown in FIGS. 9 and 11, notches 82 leading to the through hole 76 are formed on both sides of each sealing-device hook 77. In addition, on the outside of each restraining wall 80, a groove 84, which is a trace of forming the restraining wall 80 by press punching, is formed.

The sealing device 8 according to the embodiment may be the same as the sealing device 8 of the first embodiment, but the use of the present invention is not limited to the embodiment. Various types of steering dust seals can be coupled to the front dash panel 2 by means of the coupling device 70.

In this embodiment, multiple sealing-device hooks 77 projecting from the reverse surface 72R of the wall part 72 of the coupling device 70 can be used to secure the sealing device 8 to the coupling device 70, whereas multiple panel hooks 78 projecting from the obverse surface 720 of the wall part 72 can be used to secure the coupling device 70 to the front dash panel 2. Therefore, the sealing device 8 can be easily attached to the front dash panel 2.

In this embodiment, the sealing-device hooks 77 protrude directly from the reverse surface 72R of the wall part 72 with which the flange 8A of the sealing device 8 is in surface contact, but the proximal ends of the sealing-device hooks 77 do not have to coincide with the reverse surface 72R of the wall part 72, and another member may be interposed therebetween. In addition, the panel hooks 78 directly protrude from the obverse surface 720 of the wall part 72 that is in surface contact with the wall part 74, but the proximal ends of the panel hooks 78 do not have to coincide with the obverse surface 720, and another member may be interposed therebetween.

As shown in FIG. 10, the axial length of the coupling device 70 is less than the axial length of the sealing device 8. By reducing the size of the coupling device 70 in this manner, it is possible to reduce the space for attaching the sealing device 8 to the panel 2.

Furthermore, in this embodiment, the wall part 74 formed of a foam material can be compressed between the wall part 72 and the front dash panel 2 to seal the gap between the wall part 72 and the front dash panel 2. Since the wall part 74 is formed of a foam material, when the coupling device 70 is fixed to the front dash panel 2, the reactive force exerted on the wall part 72 by the wall part 74, which is compressed between the wall part 72 and the front dash panel 2, is remarkably small. Therefore, when the panel hooks 78 are hooked on the front dash panel 2, the feeling of a snap associated with the movement of the panel hooks 78 is easily transmitted to the user. Specifically, when the distal hasp portions 78D of the panel hooks 78 are caught by the front dash panel 2, the force required to push the coupling device 70 toward the front dash panel 2 is momentarily reduced. The user can surely feel that the panel hooks 78 have been hooked on the front dash panel 2, and thus, that the coupling device 70 has been coupled to the front dash panel 2.

The wall part 74 made of a foam material covers the shaft hole 4 of the front dash panel 2, and is compressed in contact with the front dash panel 2. Therefore, even though an elastic ring such as the resilient ring 12 in the first embodiment is not used, the entry of foreign matter from the engine compartment into the passenger compartment is suppressed. In addition, since the wall part 74 is formed of a foam material, the deformability thereof is high. Even if the finish of the surface of the front dash panel 2, the dimension of the shaft hole 4, the thickness of the front dash panel 2, etc. vary, the wall part 74 has excellent ability to seal the gap between the wall part 72 and the front dash panel 2.

Furthermore, the wall part 74 formed of a foam material has excellent ability to insulate against sound so as to suppress transmission of sound from the engine compartment into the passenger compartment.

In this embodiment, the multiple panel hooks 78 and the multiple restraining walls 80 protruding from the obverse surface 720 of wall part 72 can be used to secure the wall part 74 to the wall part 72. Therefore, the coupling device 70 can be easily handled.

The wall part 74 is constituted of a single plate of a uniform thickness, in which the through hole 75 is formed, into which the sealing device 8 is inserted. Therefore, the wall part 74 can be easily manufactured.

The wall part 72, the sealing-device hooks 77, the panel hooks 78, and the restraining walls 80 are formed of a single plate. Thus, the wall part 72, the sealing-device hooks 77, the panel hooks 78, and the restraining walls 80 can be easily manufactured.

Third Embodiment

FIGS. 13 to 16 show a third embodiment of the present invention.

Figure 13:
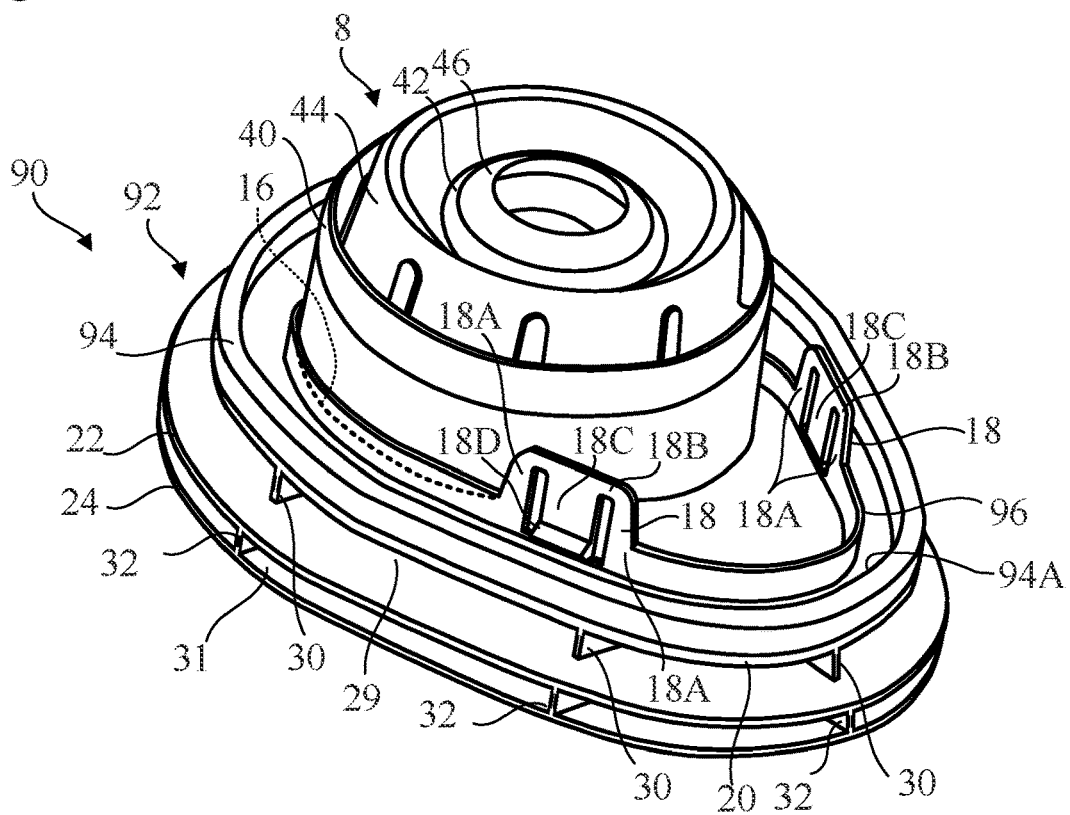
FIG. 13 is a perspective view showing a coupling device according to a third embodiment of the present invention on which a sealing device is mounted.

The coupling device 90 according to this embodiment is also used to attach the sealing device 8, which seals the gap between the front dash panel 2 and the rotational shaft 6, to the front dash panel 2 in a manner similar to that shown in FIG. 1. FIG. 13 is a perspective view showing the coupling device 90 on which the sealing device 8 is mounted. FIG. 13 is inverted compared to FIG. 1.

The coupling device 90 includes a rigid body part 92 and a foam part 94. The entire rigid body part 92 is formed of resin. However, the rigid body part 92 may be made of metal or hard rubber. The rigid body part 92 may be a composite of resin and metal, a composite of hard rubber and metal, or a composite of resin, hard rubber, and metal.

Figure 14:
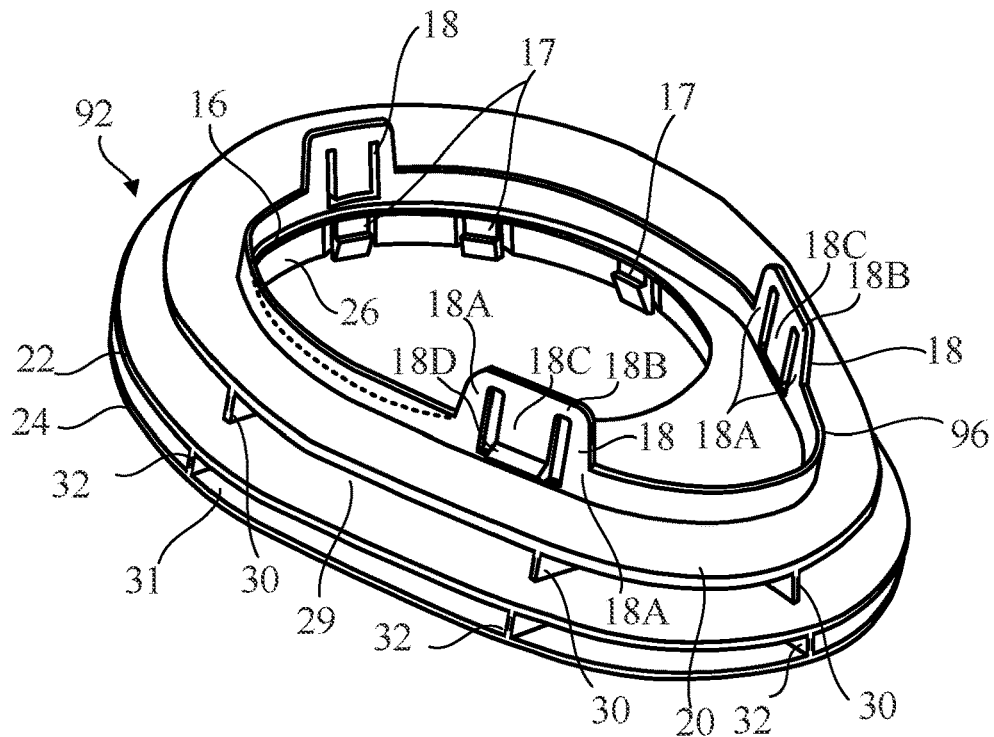
FIG. 14 is a perspective view showing a rigid body part of the coupling device according to the third embodiment.

As shown in FIG. 14, the rigid body part 92 has a shape similar to that of the coupling device 10 of the first embodiment. However, in contrast to the coupling device 10 of the first embodiment, the rigid body part 92 does not have the wall part 14. In this embodiment, the wall part 20 is used in place of the wall part 14 of the coupling device 10 of the first embodiment. A circular through hole 16 is formed in the wall part 20, and a substantially cylindrical sealing device 8 is inserted into the through hole 16.

The panel hooks 18 are located on the side of the second surface side of the wall part 20, i.e., the engine compartment side, and are located around the through hole 16. In this embodiment, the three panel hooks 18 are formed at an annular wall 96 integrally attached to the obverse surface of the wall part 20. The outline shape of the annular wall 96 is similar to the shaft hole 4 (see FIG. 1) of the front dash panel 2 covered by the wall part 20 (e.g., an egg shape).

The sealing-device hooks 17 are located on the side of the first surface (passenger compartment side) of the wall part 20, are integrally attached to the wall part 20, and are located around the through hole 16. A ring 26 is arranged on the outside of the multiple sealing-device hooks 17, and is connected to the wall part 20.

Other configurations of the rigid body part 92 including the extremely-large wall part 22, the second extremely-large wall part 24, and the reinforcing ribs 30 and 32 are the same as those of the coupling device 10 in the first embodiment.

Figure 15:
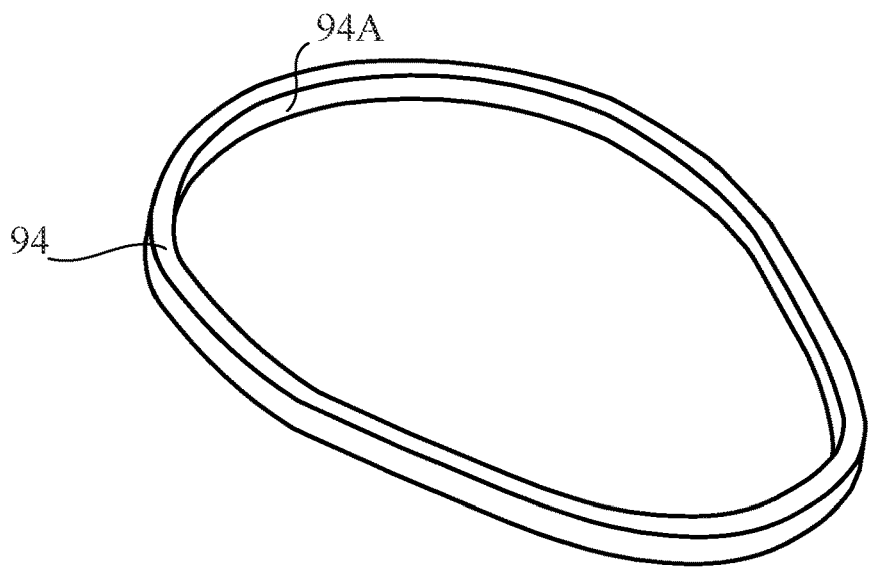
FIG. 15 is a perspective view showing a foam part of the coupling device according to the third embodiment.

The foam part 94 is formed of a foam material. Preferred foam materials include foamed rubbers, e.g., foamed ethylene propylene diene rubber, or foamed resins. As shown in FIG. 15, the foam part 94 is constituted of a single ring of a uniform thickness. The foam part 94 has an outline shape similar to that of the shaft hole 4, for example, an egg shape. A through hole 94A having a shape similar to that of the shaft hole 4 is formed in the foam part 94. The outer annular part 40 of the sealing device 8 and the annular wall 96 of the rigid body part 92 are to be inserted into the through hole 94A.

The foam part 94 is fixed to the obverse surface (second surface) of the wall part 20 of the rigid body part 92 on the side of the panel hooks 18 by an adhesive or other fixing means.

Figure 16:
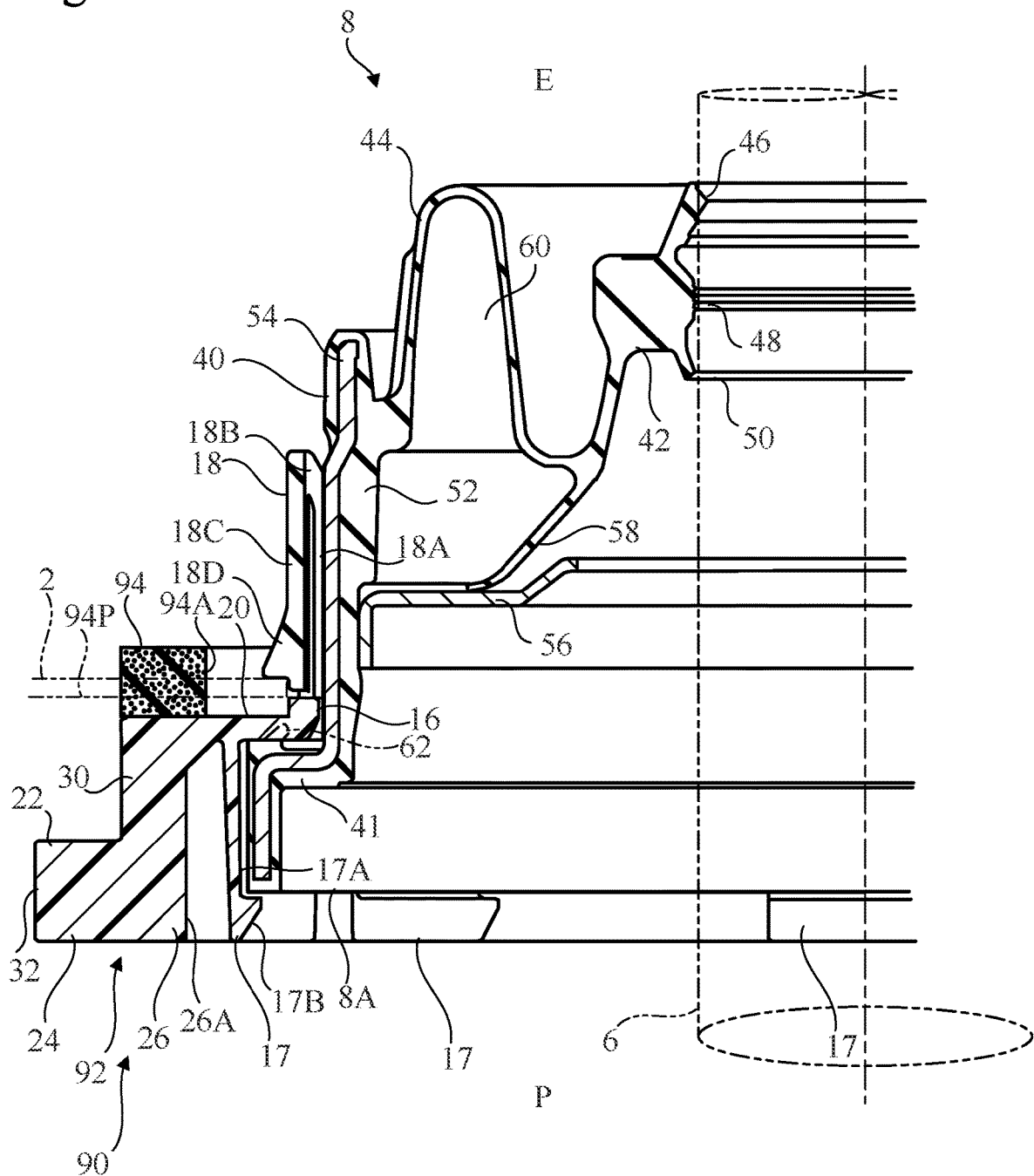
FIG. 16 is an enlarged cross-sectional view showing a state of use of the coupling device according to the third embodiment.

As shown in FIG. 16, when the coupling device 90 is used, after the sealing device 8 is inserted into the through hole 16, the sealing-device hooks 17 are arranged outside the sealing device 8. The sealing-device hooks 17 extend in parallel to the axial direction of the sealing device 8 from the wall part 20. The distal hasp portions 17B of the sealing-device hooks 17 are hooked on the flange 8A of the sealing device 8 from the outside. The flange 8A of the sealing device 8 is pinched between the distal hasp portions 17B of the sealing-device hooks 17 and the wall part 20, so that the sealing device 8 is fixed to the coupling device 90.

When the sealing device 8 is inserted into the through hole 16, the panel hooks 18 are arranged outside the sealing device 8. The panel hooks 18 extend from the wall part 20 in parallel to the axial direction of the sealing device 8, and are inserted into the shaft hole of the front dash panel 2. The distal hasp portions 18D of the panel hooks 18 are hooked on the periphery of the shaft hole of the front dash panel 2 from the inside. The front dash panel 2 is pinched between the distal hasp portions 18D of the panel hooks 18 and the wall part 20, so that the coupling device 90 is fixed to the front dash panel 2. The foam part 94 secured to the wall part 20 is compressed between the wall part 20 and the front dash panel 2. FIG. 16 shows the foam part 94 in an uncompressed state, and the phantom line 94P in FIG. 16 shows the height of the compressed foam part 94. The foam part 94 is located around the shaft hole of the front dash panel 2, is compressed between the wall part 20 and the front dash panel 2 for sealing the gap between the wall part 20 and the front dash panel 2 to suppress the entry of foreign matter into the passenger compartment from the engine compartment.

Since the foam part 94 is formed of a foam material, when the coupling device 90 is fixed to the front dash panel 2, the reactive force exerted on the wall part by the foam part 94 compressed between the wall part 20 and the front dash panel 2 is remarkably small. Therefore, when the panel hooks 78 are hooked on the front dash panel 2, the feeling of a snap associated with the movement of the panel hooks 78 is easily transmitted to the user. Specifically, when the distal hasp portions 78D of the panel hooks 78 are caught by the front dash panel 2, the force required to push the coupling device 90 toward the front dash panel 2 is momentarily reduced. The user can surely feel that the panel hooks 78 have been caught on the front dash panel 2, and thus, that the coupling device 90 has been coupled to the front dash panel 2.

The foam part 94 formed of a foam material covers the shaft hole of the front dash panel 2, and is compressed in contact with the front dash panel 2. Therefore, even though an elastic ring such as the resilient ring 12 in the first embodiment is not used, the entry of the foreign matter from the engine compartment into the passenger compartment is suppressed. In addition, since the foam part 94 is formed of a foam, it has a high deformability. Even if the finish of the surface of the front dash panel 2, the dimension of the shaft hole of the front dash panel 2, the thickness of the front dash panel 2, etc., vary, the foam part 94 has excellent ability to seal the gap between the wall part 20 and the front dash panel 2.

Furthermore, the foam part 94 formed of a foam material has excellent ability to insulate against sound so as to suppress transmission of sound from the engine compartment into the passenger compartment.

As shown in FIG. 16, the axial length of the coupling device 90 is less than the axial length of the sealing device 8. By reducing the size of the coupling device 90 in this manner, it is possible to reduce the space for attaching the sealing device 8 to the panel 2.

Furthermore, an extremely-large wall part 22 having a larger outline than that of the wall part 20 is located farther from the panel hooks 18 than the wall part 20. The extremely-large wall part 22 is located farther from the front dash panel 2 than the wall part 20 facing the front dash panel 2, and has an outline larger than that of the outline of the wall part 20. Thus, the coupling device 90 can be easily handled, for example, the user can grasp the extremely-large wall part 22 to carry the coupling device 90, resulting in that attachment to the front dash panel 2 and detachment from the front dash panel 2 are easy.

The multiple reinforcing ribs 30 connecting the wall part 20 and the extremely-large wall part 22 improve the rigidity of the wall part 20 and the extremely-large wall part 22, and thus, the rigidity of the coupling device 90. Since each reinforcing rib 30 terminates at the outline of the wall part 20 and does not protrude from the wall part 20, it does not interfere with the handling of the coupling device 90.

Furthermore, the extremely-large wall part 22 and the second extremely-large wall part 24 having a larger outline than that of the wall part 20 are located farther from the panel hooks 18 than the wall part 20. Thus, the coupling device 90 can be easily handled, for example, the user can grasp the extremely-large wall part 22 and the second extremely-large wall part 24 to carry the coupling device 90, resulting in that attachment to the front dash panel 2 and detachment from the front dash panel 2 are easy.

The multiple reinforcing ribs 32 connecting the extremely-large wall part 22 and the second extremely-large wall part 24 improve the rigidity of the extremely-large wall part 22 and the second extremely-large wall part 24, and thus, the rigidity of the coupling device 90. Since each reinforcing rib 32 terminates at the outlines of the extremely-large wall part 22 and the second extremely-large wall part 24, and does not protrude from the extremely-large wall part 22 and the second extremely-large wall part 24, it does not interfere with the handling of the coupling device 90.

In this embodiment, the foam part 94 is secured to the wall part 20 of rigid body part 92. However, the foam part 94 does not need to be secured to the wall part 20. In other words, the foam part 94 may be brought into contact with the wall part 20 when the coupling device 90 is used.

Figure 17:
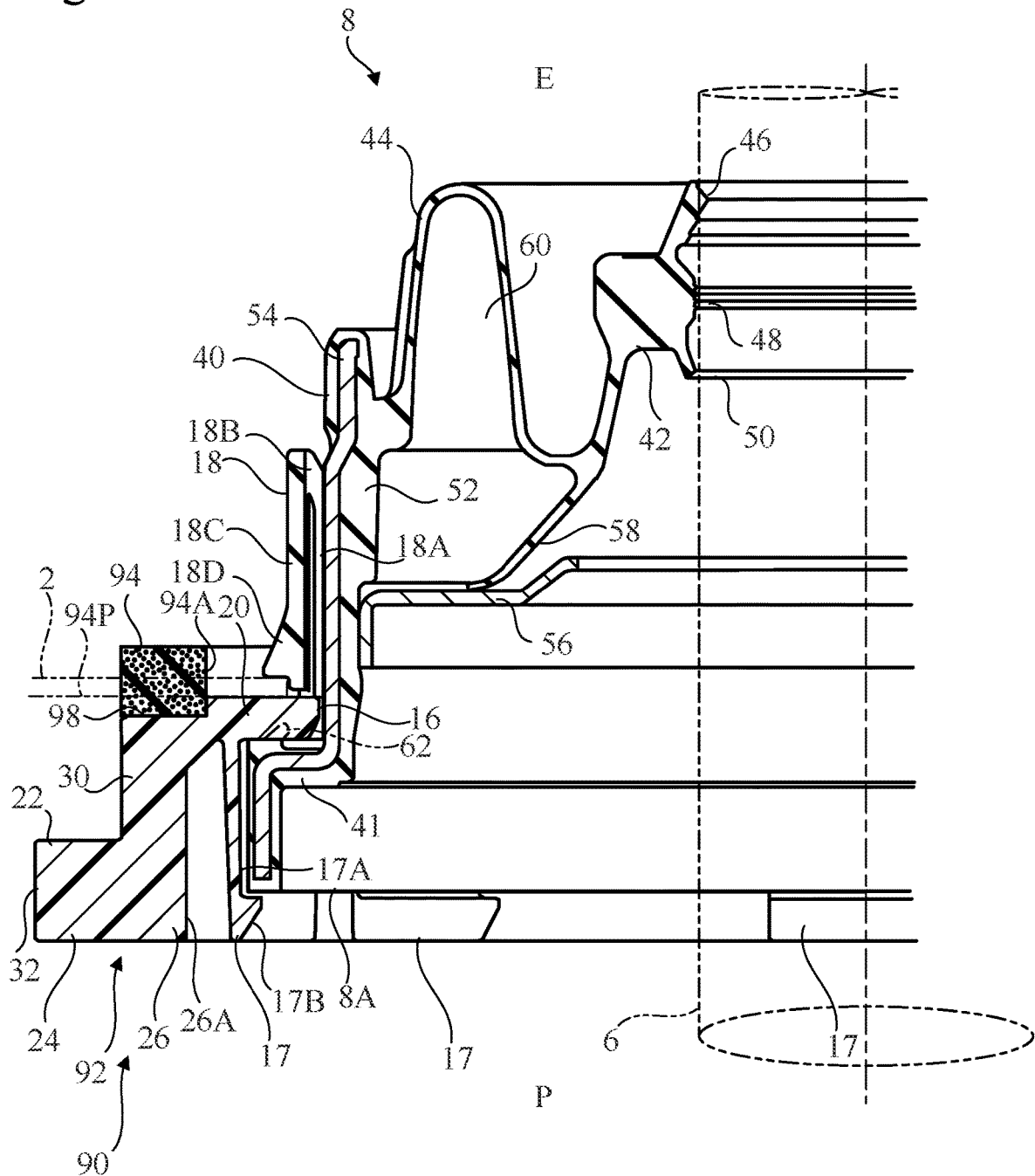
FIG. 17 is an enlarged cross-sectional view showing a state of use of a coupling device according to a modification of the third embodiment.

FIG. 17 shows a modification of this embodiment. In this modification, a circumferential groove 98 is formed in the wall part 20 of the rigid body part 92, and the foam part 94 is fitted into the circumferential groove 98 so as to be removably fixed to the wall part 20. The foam part 94 may be bonded to the circumferential groove 98 with an adhesive.

Other Modifications

Although the present invention has been described, the foregoing description is not intended to limit the present invention. Various modifications including omission, addition, and substitution of structural elements may be made within the scope of the present invention.

For example, in the above-described embodiments, the sealing device 8 is a steering dust seal, but the present invention is not limited to use for a steering dust seal, and it may be used as a sealing device for attenuating noise disposed around a rotational shaft that can be greatly eccentric.

Aspects of the present invention are also set out in the following numbered clauses:

Clause 1. A coupling device for attaching a sealing device to a panel, the sealing device sealing a gap between the panel and a rotational shaft located in a shaft hole provided in the panel, the coupling device including:

a supporting wall part including a first surface, a second surface opposite to the first surface, and a through hole into which the sealing device is to be inserted;

multiple sealing-device hooks located on a side of the first surface of the supporting wall part and located around the through hole, the sealing-device hooks for being hooked on the sealing device from outside; and multiple panel hooks located on a side of the second surface of the supporting wall part and located around the through hole, the panel hooks for being inserted into the shaft hole of the panel and to be hooked on a periphery of the shaft hole of the panel from inside.

In this aspect, the multiple sealing-device hooks can be used to secure the sealing device to the coupling device, whereas multiple panel hooks can be used to secure the coupling device to the panel. Thus, the sealing device can be easily attached to the panel.

Clause 2. The coupling device according to clause 1, further including:

a large wall part located in parallel to the supporting wall part and having an outline that is larger than an outline of the supporting wall part; and a circumferential groove formed between the second surface of the supporting wall part and the large wall part, a resilient ring being to be fit into the circumferential groove and being to be brought into contact with the panel.

According to this clause, a resilient ring fitted in the circumferential groove is compressed between the large wall part and the panel to seal the gap between the coupling device and the panel.

Clause 3. The coupling device according to clause 2, further including:

an extremely-large wall part located outside the sealing-device hooks and farther from the panel hooks than the supporting wall part, the extremely-large wall part having an outline that is larger than the outline of the supporting wall part; and multiple reinforcing ribs formed between the supporting wall part and the extremely-large wall part.

According to this clause, an extremely-large wall part is located farther from the panel hooks than the supporting wall part, the extremely-large wall part having an outline that is larger than the outline of the supporting wall part. The extremely-large wall part is located farther from the panel than the supporting wall part facing the panel and is larger than the supporting wall part. Thus, the coupling device is easy to handle, e.g. is easy to attach to and detach from the panel. In addition, the rigidity of the supporting wall part and the extremely-large wall part is improved by the multiple reinforcing ribs formed between the supporting wall part and the extremely-large wall part.

Clause 4. The coupling device according to clause 3, further including:

a second extremely-large wall part located outside the sealing-device hooks and farther from the panel hooks than the extremely-large wall part, the second extremely-large wall part having an outline that is larger than the outline of the supporting wall part; and multiple reinforcing ribs formed between the extremely-large wall part and the second extremely-large wall part and connecting the extremely-large wall part and the second extremely-large wall part.

According to this clause, the extremely-large wall part and the second extremely-large wall part that are larger than the supporting wall part are arranged farther from the panel hooks than the supporting wall part. Thus, the coupling device is easy to handle, e.g. is easy to attach to and detach from the panel. In addition, the rigidity of the extremely-large wall part and the second extremely-large wall part is improved by the multiple reinforcing ribs connecting the extremely-large wall part and the second extremely-large wall part. Preferably, the reinforcing ribs terminate at the outlines of the extremely-large wall part and the second extremely-large wall part and do not protrude from the extremely-large wall part and the second extremely-large wall part.

Clause 5. The coupling device according to clause 1, further including:

a foam part made of a foam material located on the side of the second surface of the supporting wall part in parallel to the supporting wall part.

According to this clause, the foam part can be compressed between the supporting wall part and the panel for sealing the gap between the supporting wall part and the panel. Since the foam part is formed of a foam material, when the coupling device is fixed to the panel, the reactive force exerted on the supporting wall part by the foam part, which is compressed between the supporting wall part and the panel, is significantly small. Therefore, when the panel hooks are hooked on the panel, the feeling of a snap associated with the movement of the panel hooks is easily transmitted to the user. The user can surely feel that the panel hooks have been hooked on the panel, and thus, that the coupling device has been coupled to the panel. The foam part formed of a foam material covers the shaft hole of the panel and is compressed in contact with the panel. Accordingly, the foam part seals the gap between the supporting wall part and the panel to suppresses the entry of foreign matter. In addition, since the foam part is formed of a foam material, it has a high deformability. Even if the finish of the surface of the panel, the size of the shaft hole, the thickness of the panel, etc. vary, the foam part has excellent ability to seal the gap between the supporting wall part and the panel. Furthermore, the foam part formed of a foam material has excellent ability to insulate against sound so as to suppress transmission of sound.

Clause 6. The coupling device according to clause 5, wherein
the foam part is formed of a single plate or a single ring having a uniform thickness, the plate or the ring including a through hole formed therein through which the sealing device is to be inserted.

According to this clause, it is easy to manufacture the foam part.

Clause 7. The coupling device according to clause 5 or 6, wherein the supporting wall part, the sealing-device hooks, and the panel hooks are formed of a single plate.

According to this clause, it is easy to manufacture the supporting wall part, the sealing-device hooks, and the panel hooks.

Clause 8. The coupling device according to any one of clauses 5-7, further including:
multiple restraining walls located on the side of the second surface of the supporting wall part and cooperating to surround the foam part.

According to this clause, the multiple panel hooks and the multiple restraining walls can be used to secure the foam part to the supporting wall part. Thus, handling of the coupling device is easy.

Clause 9. The coupling device according to any one of clauses 1-8, having an axial length that is less than an axial length of the sealing device.

According to this clause, the size of the coupling device can be reduced, thereby reducing the space for attaching the sealing device to the panel.

Clause 10. A sealing device for sealing a gap between a panel and a rotational shaft located in a shaft hole provided in the panel, the sealing device including:
a flange that is to be fixed to a coupling device for coupling the sealing device to the panel;
a seal lip located radially inside the flange for being in contact with an outer peripheral surface of the rotational shaft; and
an annular seal lip formed on the flange for being in contact with the coupling device.

In this aspect, the sealing device can be fixed to the coupling device with the use of the flange. Thus, the sealing device can be easily attached to the panel. In addition, since an annular seal lip is formed on the flange and is to be in contact with the coupling device, the gap between the sealing device and the coupling device is sealed with the seal lip.

The invention claimed is:

1. A coupling device for attaching a sealing device to a panel, the sealing device sealing a gap between the panel and a rotational shaft located in a shaft hole provided in the panel, the coupling device comprising:
a supporting wall part comprising a first surface, a second surface opposite to the first surface, and a through hole into which the sealing device is to be inserted;
multiple sealing-device hooks integrally formed on the first surface of the supporting wall part and located around the through hole, the sealing-device hooks for being hooked on the sealing device from outside, so that the sealing device is pinched between the multiple sealing-device hooks and the first surface; and
multiple panel hooks integrally formed on the second surface of the supporting wall part and located around the through hole, the panel hooks for being inserted into the shaft hole of the panel and to be hooked on a periphery of the shaft hole of the panel from inside, so that the panel is pinched between the multiple panel hooks and the second surface.

2. The coupling device according to claim 1, having an axial length that is less than an axial length of the sealing device.

3. A coupling device for attaching a sealing device to a panel, the sealing device sealing a gap between the panel and a rotational shaft located in a shaft hole provided in the panel, the coupling device comprising:
a supporting wall comprising a first surface, a second surface opposite to the first surface, and a through hole into which the sealing device is to be inserted;
multiple sealing-device hooks located on a side of the first surface of the supporting wall part and located around the through hole, the sealing-device hooks for being hooked on the sealing device from the outside;
multiple panel hooks located on a side of the second surface of the supporting wall part and located around the through hole, the panel hooks for being inserted into the shaft hole of the panel and to be hooked on a periphery of the shaft hole of the panel from inside;
a large wall part located in parallel to the supporting wall part and having an outline that is larger than an outline of the supporting wall part; and
a circumferential groove formed between the second surface of the supporting wall part and the large wall part, a resilient ring being to be fit into the circumferential groove and being to be brought into contact with the panel.

4. The coupling device according to claim 3, having an axial length that is less than an axial length of the sealing device.

5. A coupling device for attaching a sealing device to a panel, the sealing device sealing a gap between the panel and a rotational shaft located in a shaft hole provided in the panel, the coupling device comprising:
a supporting wall part comprising a first surface, a second surface opposite to the first surface, and a through hole into which the sealing device is to be inserted;
multiple sealing-device hooks located on a side of the first surface of the supporting wall part and located around the through hole, the sealing-device hooks for being hooked on the sealing device from outside;
multiple panel hooks located on a side of the second surface of the supporting wall part and located around the through hole, the panel hooks for being inserted into the shaft hole of the panel and to be hooked on a periphery of the shaft hole of the panel from inside; and a foam part made of a foam material located on the side of the second surface of the supporting wall part in parallel to the supporting wall part.

6. The coupling device according to claim 5, wherein the foam part is formed of a single plate or a single ring having a uniform thickness, the plate or the ring comprising a through hole formed therein through which the sealing device is to be inserted.

7. The coupling device according to claim 6, further comprising:
multiple restraining walls located on the side of the second surface of the supporting wall part and cooperating to surround the foam part.

8. The coupling device according to claim 5, further comprising:
multiple restraining walls located on the side of the second surface of the supporting wall part and cooperating to surround the foam part.

9. The coupling device according to claim 5, having an axial length that is less than an axial length of the sealing device.

* * * * *